(12) United States Patent
Leroy et al.

(10) Patent No.: US 11,242,834 B1
(45) Date of Patent: Feb. 8, 2022

(54) BELT-INTEGRATED-STARTER-GENERATOR-ASSISTED ENGINE SHUTDOWN

(71) Applicant: Ford Global Technologies, LLC, Dearborn, MI (US)

(72) Inventors: Tom Leroy, Dagenham (GB); Nicholas Dashwood Crisp, Hadleigh (GB); Wassim Koubaa, London (GB); Jonathan James Hall, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/018,226

(22) Filed: Sep. 11, 2020

(51) Int. Cl.
| | |
|---|---|
| *F02N 11/08* | (2006.01) |
| *F02N 11/04* | (2006.01) |
| *B60K 17/04* | (2006.01) |
| *F02B 63/04* | (2006.01) |
| *B60K 17/02* | (2006.01) |

(52) U.S. Cl.
CPC .......... *F02N 11/0859* (2013.01); *B60K 17/02* (2013.01); *B60K 17/04* (2013.01); *F02B 63/042* (2013.01); *F02N 11/04* (2013.01); *F02N 11/0862* (2013.01); *F02N 2200/022* (2013.01); *F02N 2200/023* (2013.01); *F02N 2200/041* (2013.01); *F02N 2200/08* (2013.01)

(58) Field of Classification Search
None
See application file for complete search history.

(56) References Cited

U.S. PATENT DOCUMENTS

| | | | | |
|---|---|---|---|---|
| 8,606,450 | B2 * | 12/2013 | Holmes | B60W 20/00 701/22 |
| 8,914,180 | B2 * | 12/2014 | Holmes | B60W 20/40 701/22 |
| 9,764,732 | B2 * | 9/2017 | Kim | B60W 20/17 |
| 10,029,695 | B1 * | 7/2018 | Gibson | B60W 10/08 |
| 10,864,904 | B2 * | 12/2020 | Sato | F02D 41/042 |
| 2013/0066492 | A1 * | 3/2013 | Holmes | B60K 6/485 701/22 |
| 2014/0052321 | A1 * | 2/2014 | Holmes | B60W 20/13 701/22 |
| 2016/0288782 | A1 * | 10/2016 | Kim | B60W 10/06 |
| 2017/0101086 | A1 * | 4/2017 | Oshiumi | B60K 6/387 |
| 2019/0135263 | A1 * | 5/2019 | Sato | B60K 6/26 |
| 2019/0232939 | A1 * | 8/2019 | Mizuguchi | B60K 6/40 |
| 2019/0276003 | A1 * | 9/2019 | Tsukada | B60W 20/13 |

FOREIGN PATENT DOCUMENTS

GB    2565840 A    2/2019

* cited by examiner

*Primary Examiner* — Kevin R Steckbauer
(74) *Attorney, Agent, or Firm* — David B Kelley; Brooks Kushman P.C.

(57) ABSTRACT

A vehicle includes an engine including a crank shaft; a battery; a belt-integrated starter generator (BISG) mechanically coupled to the crank shaft and configured to generate electric power from motion of the engine to charge the battery; and a controller configured to operate the BISG to apply a load to the crank shaft to slow the engine and capture electric power for storage in the battery, wherein an initial magnitude of the load is proportional to a temperature of the engine, responsive to a speed of the BISG or engine achieving a predetermined non-zero threshold, remove the load from the crank shaft, and bring the engine to a stop.

16 Claims, 3 Drawing Sheets

BELT-INTEGRATED-STARTER-GENERATOR-ASSISTED ENGINE SHUTDOWN

TECHNICAL FIELD

The present disclosure generally relates to a vehicle system for shutting down a vehicle engine.

BACKGROUND

Modern internal combustion engines have low internal friction to provide improved fuel economy and reduced component wear. Additionally, many engines are fitted with a fly wheel such as a dual mass flywheel, which is used for idle speed stability and vehicle launch robustness. The low internal friction and flywheel may reduce the engine shutdown speed. Some vehicles are provided with an engine stop/start feature which is configured to frequently shutdown the engine. During the shutdown process, the engine speed reduces from idle speed or higher to zero revolutions per minute (RPM), passing an engine mechanical resonance (usually a low frequency).

SUMMARY

In one or more illustrative embodiments of the present disclosure, a vehicle includes an engine including a crank shaft; a battery; a belt-integrated starter generator (BISG) mechanically coupled to the crank shaft and configured to generate electric power from motion of the engine to charge the battery; and a controller configured to operate the BISG to apply a load to the crank shaft to slow the engine and capture electric power for storage in the battery, wherein an initial magnitude of the load is proportional to a temperature of the engine, responsive to a speed of the BISG or engine achieving a predetermined non-zero threshold, remove the load from the crank shaft, and bring the engine to a stop.

In one or more illustrative embodiments of the present disclosure, a method for a vehicle includes by a controller, operating a BISG to apply a load having an initial magnitude to a crank shaft of an engine to slow the engine and capture electric power for storage in a battery, wherein the initial magnitude depends on a state of a clutch of a transmission such that the initial magnitude is lesser responsive to the clutch slipping or being closed, and the initial magnitude is greater responsive to the clutch being open, responsive to a speed of the BISG or engine achieving a predetermined non-zero threshold, removing the load from the crank shaft, and bringing the engine to a stop.

In one or more illustrative embodiments of the present disclosure, a vehicle includes an engine including a crank shaft; a battery; a belt-integrated starter generator (BISG) mechanically coupled to the crank shaft and configured to generate electric power from motion of the engine to charge the battery; and a controller configured to operate the BISG to apply a load to the crank shaft to slow the engine and capture electric power for storage in the battery, wherein an initial magnitude of the load is proportional to a speed of the BISG or engine, and responsive to the speed achieving a predetermined non-zero threshold, remove the load from the crank shaft.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
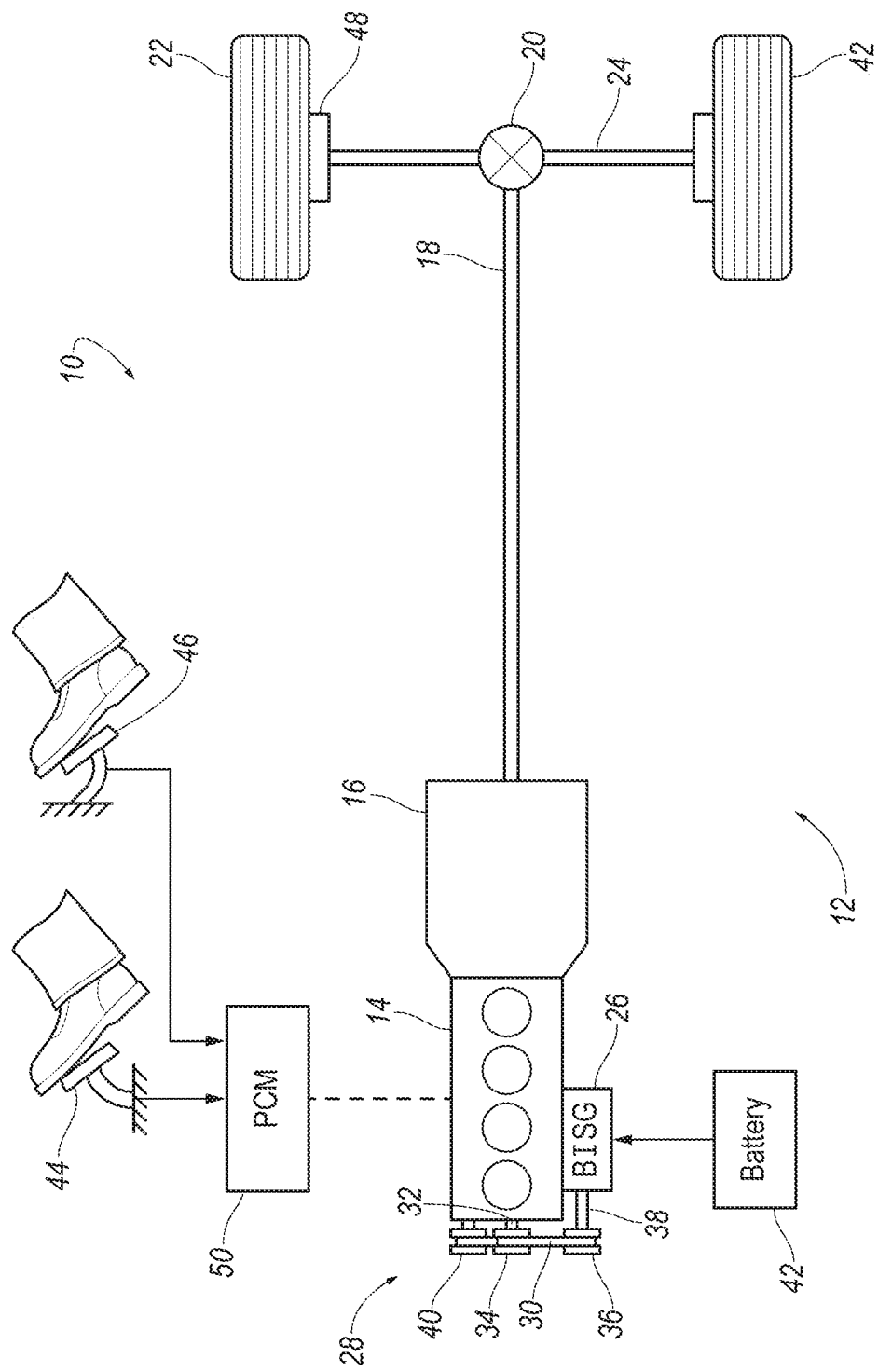
FIG. 1 illustrates a schematic diagram of a mild-hybrid electric vehicle.

Referring to FIG. 1, a schematic diagram of a mild-hybrid electric vehicle (MHEV) 10 is illustrated according to an embodiment of the present disclosure. The vehicle 10 includes a powertrain 12. The powertrain 12 includes an engine 14 that drives a transmission 16, e.g., a multiple step-ratio automatic transmission. The engine 14 may be an internal combustion engine fueled by gasoline, diesel, or natural gas, etc. The output of the transmission 16 is coupled to a driveshaft 18 that transmits torque to a differential 20. The differential 20 distributes torque to wheels 22 via shafts 24. The example vehicle 10 is shown as rear-wheel drive, but may be front-wheel drive, all-wheel drive, or four-wheel drive in other embodiments.

The powertrain 12 further includes an associated controller 50 such as a powertrain control module (PCM). While illustrated as one controller, the controller 50 may be part of a larger control system and may be controlled by various other controllers throughout the vehicle 10, such as a vehicle system controller (VSC). It should therefore be understood that the PCM 50 and one or more other controllers can collectively be referred to as a "controller" that controls various actuators in response to signals from various sensors to control functions such as operating the engine 14, operating the transmission 16, operating an electric machine, etc. The controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example, KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 50 communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. The controller 50 may communicate signals to and/or from the engine 14, the transmission 16, etc. Although not explicitly illustrated, those of ordinary skill in the art will recognize various functions or components that may be controlled by the controller 50 within each of the subsystems identified above. Representative examples of parameters, systems, and/or components that may be directly or indirectly actuated using control logic and/or algorithms executed by the controller 50 include fuel injection timing, rate, and duration, throttle-valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, electric machine operation, clutches, and the like. Sensors communicating input through the I/O interface may be used to indicate turbocharger boost pressure, crankshaft position, engine rotational speed (RPM), wheel, vehicle speed, coolant temperature, intake manifold pressure, accelerator-pedal position, ignition switch position, throttle-valve position, air temperature, exhaust gas oxygen or other exhaust gas component concentration or presence, intake air flow, transmission gear, ratio, or mode, transmission oil temperature, transmission turbine speed, torque converter bypass clutch status, battery temperature, voltage, current, or state of charge (SOC) for example.

The vehicle 10 includes a BISG 26 (sometimes called a motor/generator) that is connected to FEAD 28. The BISG 26 generally replaces the alternator. The BISG 26 is an electric machine configured to act as a motor and/or a generator. The BISG 26 may be a three-phase electric motor. The FEAD 28 includes a tension member, e.g., a belt 30, that operably couples the BISG 26 to crankshaft 32 of the engine 14. For example, the engine 14 includes an associated pulley 34 that is supported on the crankshaft 32 and the BISG 26 includes an associated pulley 36 that is supported on a shaft 38 of the BISG 26. The shaft 38 may be fixed to the rotor of the BISG 26 and may be referred to as a rotor shaft. The belt 30 is trained over these pulleys so that torque can be transmitted between the engine 14 and the electric machine 26. One or more accessories may include pulleys, generally illustrated as pulley 40, that are also engaged with the belt 30, or with a second belt that connects to the crankshaft 32. That is, the FEAD 28 may include a single belt or multiple belts. The FEAD 28 allows the accessories to be powered by the engine 14, the BISG 26, or a combination thereof.

The BISG 26 is electrically connected to a battery 42. The battery 42 may be a high-voltage or a low-voltage battery. For example, the battery 42 and the BISG 26 may be part of a 12V, and/or 48V electrical system. The BISG 26 may be connected to the battery 42 and other vehicle electrical systems though power electronics (not shown). The BISG 26 may be configured to operate as a motor to start the engine 14 during an engine start-up event, or to provide additional torque to the powertrain 12 during vehicle operations. The BISG 26 may also be configured to receive torque from the engine 14 and operate as a generator to recharge the battery 42 and power electrical loads of the vehicle 10. The BISG 26 may further be configured to perform regenerative braking. In the regenerative mode, the BISG 26 may receive torque from the engine 14 to reduce the engine and vehicle speed. The controller 50 may be configured to transmit signals to the BISG 26 to operate the BISG 26 as either a motor or a generator. The BISG 26 may be configured to provide electrical energy to charge the battery 42 or provide electrical energy to power the vehicle accessories when operating as a generator.

An accelerator pedal 44 may be used by the driver of the vehicle 10 to provide a demanded torque, power, or drive command (herein "driver-demanded torque") to propel the vehicle 10. In general, depressing and releasing the accelerator pedal 44 generates an accelerator-pedal position signal that may be interpreted by the controller 50 to determine the driver-demanded torque. A brake pedal 46 is also used by the driver of the vehicle 10 to provide a demanded braking torque to slow the vehicle 10. In general, depressing and releasing the brake pedal 46 generates a brake-pedal position signal that may be interpreted by the controller 50 as a demand to decrease the vehicle speed. Based upon inputs from the accelerator pedal 44 and brake pedal 46, the controller 50 commands torque to the engine 14, the BISG 26, and friction brakes 48. The controller 50 is programmed to arbitrate the driver-demanded torque between the engine 14 and BISG 26, and to arbitrate the braking torque between the regenerative braking via the BISG 26 and friction brakes 48.

Depending upon the size of the vehicle 10 and the power rating of the BISG 26, the vehicle 10 may be propelled, at least at low speeds, by either the engine 14 or BISG 26. For example, the vehicle 10 may include an electric creep mode in which the BISG 26 propels the vehicle 10 when the engine 14 is OFF. Creep, in one example, refers to movement of the vehicle 10 when both the brake pedal 46 and accelerator pedal 44 are released. Typical creep speeds are less than 10 miles per hour. In other situations, both the engine 14 and BISG 26 act as drive sources to propel the vehicle 10. The engine 14 generates engine power at the crankshaft 32 that is added with power output from the BISG 26 through the FEAD 28. This combined power is then sent to the driven wheels 22 though the transmission 16 and the drivetrain.

The BISG 26 may be further configured to assist to slow down and/or stop the engine 14 by applying a torque to the crankshaft 32 of the engine 14 via the FEAD 28. The engine stop may be manually triggered by user input to the PCM 50 via an interface (e.g. ignition key/button). Additionally or alternatively, the engine stop may be triggered automatically by the PCM 50 responsive to one or more predefined conditions being met. For instance, the vehicle 10 may be provided with an engine stop/start feature enabled by the PCM 50. Upon detecting one or more predefined engine stop conditions (e.g. the vehicle 10 stops in traffic), the PCM 50 may send a stop signal to the engine 14 commanding the engine 14 to stop to save fuel and reduce emissions. During the stop event, the engine 14 reduces the rotation speed from an idling (or higher) speed to zero. The BISG 26 may be configured to assist the engine stop event by applying a negative torque (a load) to the engine 14 to shorten the engine stop time. The benefit for a shortened engine stop time may include reduced fuel consumption and emissions, and reduced vibration to provide an improved user experience. The BISG 26 may be configured to continuously apply the negative torque until the engine 14 speed reaches zero. Alternatively, the BISG 26 may be configured to only apply the negative torque during a partial period of the engine stop process and remove the negative torque from the engine 14 before the engine speed reaches zero (to be discussed in detail below).

Figure 2:
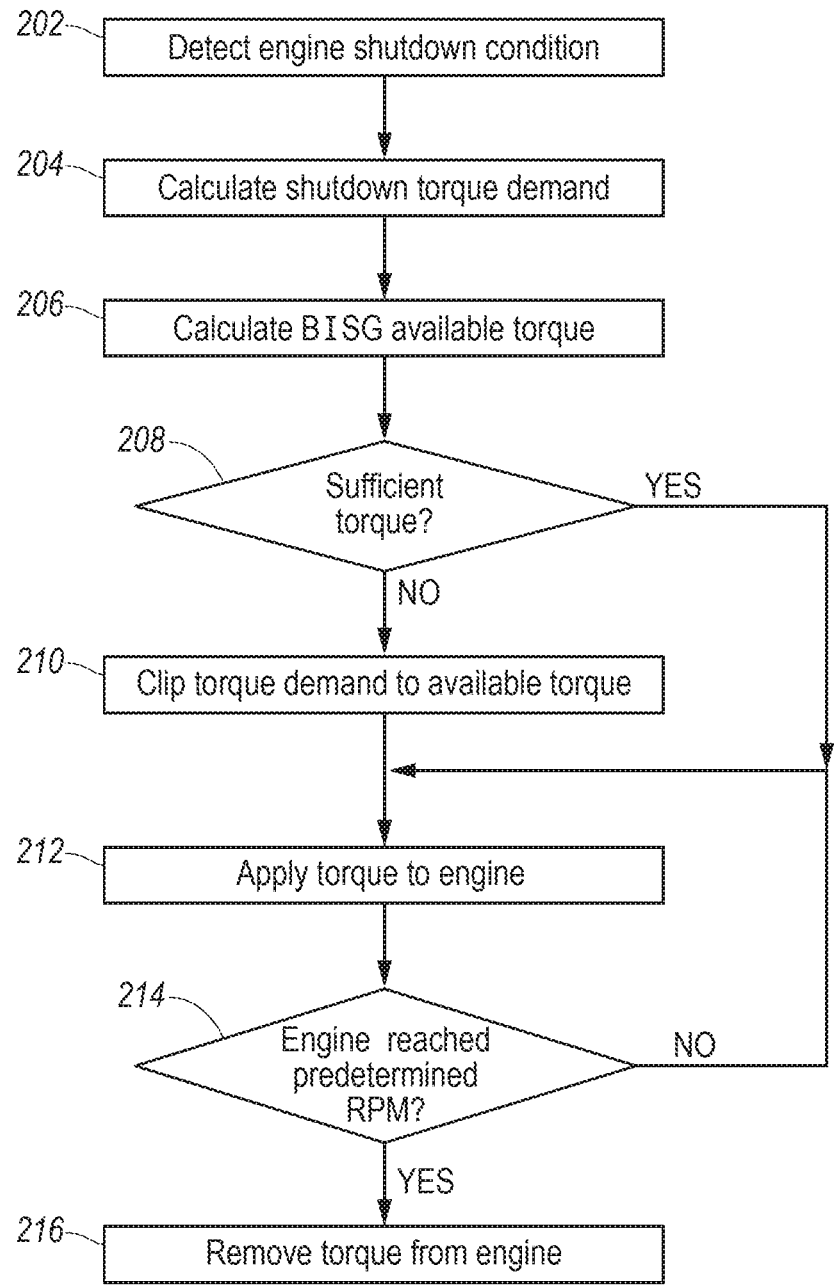
FIG. 2 illustrates a flow diagram of the engine stop process.

FIG. 2 illustrates an example BISG engine stop process 200 of one embodiment of the present disclosure. Although the process 200 will be described with reference to the PCM 50 illustrated in FIG. 1 as an example, it is noted that it is not limited thereto. The process 200 may be additionally or alternatively implemented via other controllers, devices or the like. At operation 202, the PCM 50 detects one or more predefined engine shutdown conditions. For instance, the PCM 50 may be provided with a vehicle stop/start feature and configured to automatically shut down the vehicle engine 14 responsive to one or more predefined conditions being met. In response, at operation 204, the PCM 50 calculates a shutdown torque demand having an initial magnitude based on various factors to facilitate the engine shutdown. As an example, the PCM 50 may begin with an initial default torque value, which may then be adjusted depending on specific vehicle operating conditions for the anticipated shutdown detected at operation 202. As a few non-limiting examples, the initial shutdown torque demand may be dependent on factors including vehicle, engine, or BISG speeds when the shutdown starts, a temperature of the vehicle engine 14, a state (e.g., closed, slipping, open) of a clutch of the transmission 16, and/or a pitch of the vehicle 10, etc. The extent to which these factors may increase or decrease the initial magnitude of the shutdown torque demand can be determined via testing, simulation, etc. for particular applications. The vehicle, engine, or BISG speed may also be used to select an initial default torque, which is then adjusted based on the other factors mentioned. Other scenarios are also contemplated.

In one example, the PCM 50 may be configured to start the shutdown when the vehicle 10 is still in motion before the engine 14 reaches idling speed (e.g. 600-800 RPM). In general, the initial shutdown torque demand may increase with the vehicle speed at which the shutdown starts. Additionally, the initial shutdown torque demand may be dependent on an auxiliary load on the FEAD 28 when the engine 14 starts to shut down. An auxiliary load may include, but not be limited to, an engaged air conditioning (AC) compressor driven by the FEAD 28. In general, the initial shutdown torque demand may decrease with the presence of the auxiliary load as the load may already be causing a drag/delay on the engine 14. Other factors as mentioned above may also impact the initial shutdown torque demand. The higher the temperature of the vehicle engine 14, the greater the initial shutdown torque demand. Positive (uphill) pitch may cause the initial shutdown torque to be decreased as compared with negative (downhill) pitch. Furthermore, the initial shutdown torque may be greater when a clutch of the transmission 16 is open as compared to when the clutch is slipping or closed, all else being same.

At operation 206, the PCM 50 calculates an available torque that the BISG 26 can output to assist the engine shutdown. The BISG 26 may be configured to perform a regenerative event by applying a load (i.e. negative toque) to the engine 14 to assist the slowdown and/or shutdown. The BISG 26 may be provided with a default output torque which may be adjusted by various factors (described above) for available torque output. For instance, the available torque may be calculated based on the SOC of the battery 42 when the regenerative event is performed. In case that the battery 42 is fully charged and cannot accept more charge produced by the regenerative event, the available torque from the BISG 26 may be reduced to an acceptable level to avoid overcharging the battery 42. The available torque may be further dependent on other factors such as operating temperature, speed, power, current, and/or voltage of the BISG 26 to ensure that the available torque output will not violate any hardware constraints to the BISG 26, the FEAD 28, as well as any other related components of the vehicle 10.

With both the shutdown torque demand by the engine 14 and the available torque from the BISG 26 calculated, at operation 208, the PCM 50 determines if the available torque is sufficient to satisfy the shutdown torque demand. If the answer is Yes, the process 200 proceeds directly to operation 212 and the PCM 50 applies the torque as demanded by the engine 14 to assist the engine shutdown. In case the available torque exceeds the torque demand, the PCM 50 may be configured to apply only the demanded torque to the engine 14 to assist the shutdown in a preconfigured manner. If the answer for operation 208 is No, the process 200 proceeds to operation 210 and the PCM 50 adjusts the torque demand according to the available torque to prepare for the engine shutdown. Since the torque demand is reduced, a longer engine shutdown time is expected. The PCM 50 may calculate an adjusted shutdown pattern based on the torque demand as adjusted, and apply the available torque to the engine 14 at operation 212.

The system may be configured to apply the torque to the engine 14 to assist slowing down the engine 14 until a predefined non-zero engine speed is reached. By removing the torque before the engine 14 completely stops, engine vibration can be further reduced and engine shutdown may be performed more smoothly from the user's perspective. Due to the improved user experience, the user may be less likely to disable the vehicle stop/start feature which should result in improved fuel efficiency and emissions.

At operation 214, the PCM 50 verifies if the engine 14 has reached the predetermined RPM at which the negative torque is to be removed from the engine 14. If the answer is No, the process 200 returns to operation 212 and the PCM 50 continues to apply the torque to the engine 14. In one embodiment, the torque that the BISG 26 applies to the engine 14 may be dynamically adjusted based on one or more feedback(s) from the BISG 26 and/or engine 14. For instance, if the actual detected RPM at a given time is higher than the anticipated RPM, the PCM 50 may increase the negative torque output by the BISG 26. The increased amount may be a predetermined value (e.g. by 1 Nm each time). Alternatively, the increased amount may dynamically depend on the difference between the actual and anticipated RPM in proportional manner. Similarly, if the actual RPM is lower than the anticipated RPM, the PCM 50 may reduce the negative torque output in a fixed or dynamic manner. If the answer for operation 214 is Yes, the process 200 proceeds to operation 216 and the PCM 50 commands the BISG 26 to stop outputting the torque to the engine 14.

Figure 3:
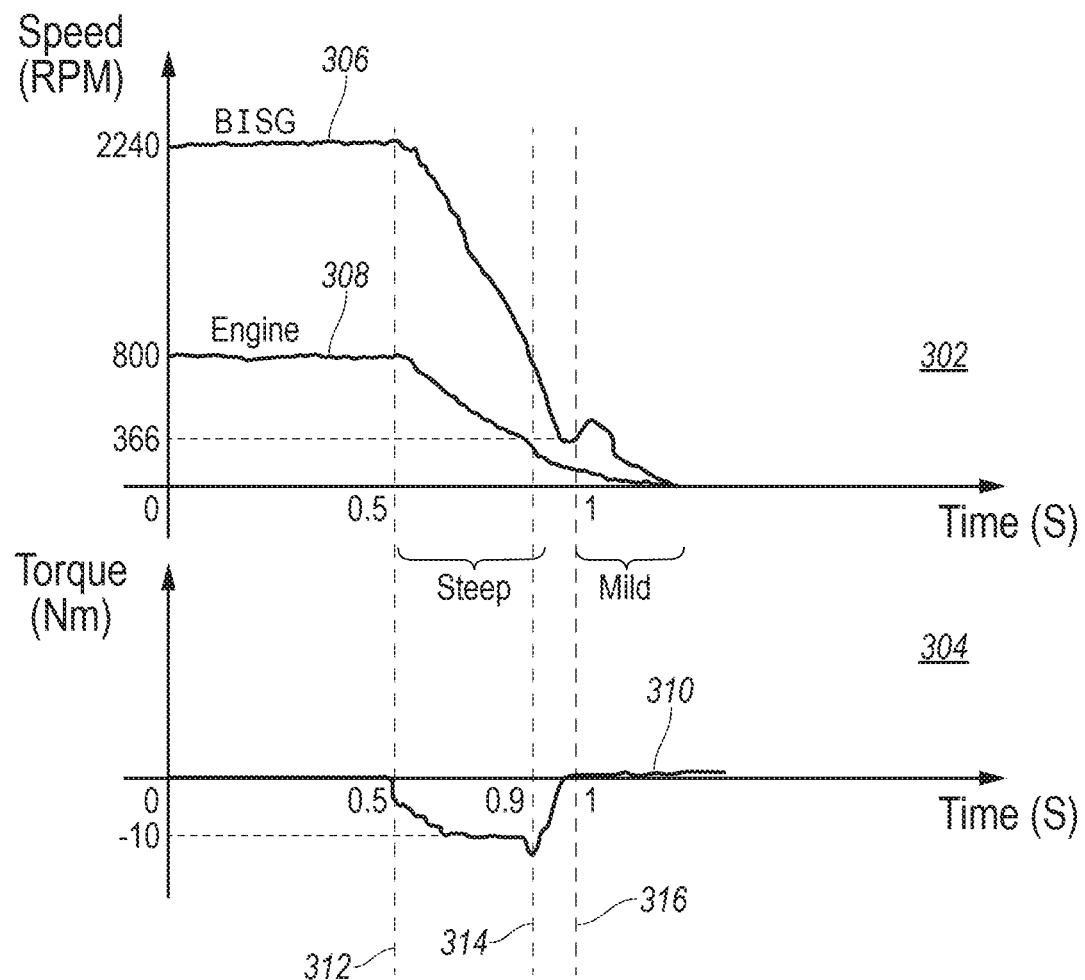
FIG. 3 illustrates a waveform diagram of the engine stop process.

Referring to FIG. 3, waveform diagrams 302 and 304 for the engine stop process are illustrated. While the top diagram 302 illustrates a BISG speed waveform 306 and an engine speed waveform 308, the bottom diagram 304 illustrates the corresponding BISG torque output waveform 310 during the assisted engine stop. In the present example, the engine 14 shuts down from the idling speed (e.g. 800 RPM) and a BISG-engine speed ratio of X2.8 is used (100 engine RPM is equivalent to 280 BISG RPM). While the engine 14 idles at about 800 RPM, the BISG 26 rotates correspondingly at around 2240 RPM. During the idling event, no negative torque is output from the BISG 26. The engine shutdown process starts at around 0.5 second in time indicated by dashed line 312. A negative shutdown torque is gradually increased to −10 Nm in the present example. As the torque is applied to the crankshaft 32, both the engine speed and the BISG speed quickly decrease. During the slowing down process, the BISG-engine speed ratio continues to generally correspond to the 2.8 design ratio. As discussed above with reference to FIG. 2, the BISG 26 may be configured to stop outputting the shutdown torque to the engine 14 at a predetermined engine speed. In the present example, the engine speed threshold may be predefined at around 130 RPM, which is approximately 366 RPM for the BISG 26 using the 2.8× speed ratio. The PCM 50 may use either the BISG speed, or the engine speed to determine if the threshold has been reached. In the present example, as the PCM 50 detects that the BISG speed approaches the predefined threshold, which occurs at around 0.9 seconds indicated by dashed line 314, the BISG gradually stops outputting the shutdown torque until the BISG speed reaches the threshold of 366 RPM (i.e. engine speed 130 RPM) which occurs at around one second indicated by dashed line 316 when the shutdown torque reduces substantially to 0 Nm. At such a low speed, the engine speed may further decrease at a milder slope until the engine 14 completely stops. It is noted in waveform 306 that as the BISG 26 stops outputting the shutdown torque at around one second, the BISG RPM increases before it eventually reaches 0 with the engine speed.

The negative torque output of the BISG applied during the engine shutdown may be a function of BISG speed and/or engine speed. Table 1 below illustrates an example of the BISG torque output depending on the BISG speed.

TABLE 1

| BISG Speed [RPM] | 2440 | 1952 | 1220 | 732 | 488 | 366 | 0 |
|---|---|---|---|---|---|---|---|
| BISG Torque [Nm] | 0 | −8 | −15 | −6 | −2 | 0 | 0 |

As illustrated in Table 1, the engine shutdown process starts at around 2440 RPM for the BISG 26. This generally corresponds to time point 312 with continuing reference to FIG. 3. The negative torque gradually increases to around −15 Nm at round 1220 RPM which generally corresponds to time point 314 when the BISG 26 starts to reduce the negative torque until time point 316 at approximately 366 RPM for the BISG 26.

In another example, the negative torque output from the BISG 26 may be not only based on BISG speed, but also on other factors, such as engine coolant temperature (e.g. less BISG negative torque output at lower temperature as there is more friction of the engine 14 at lower temperature). The negative torque output from the BISG 26 may be further dependent on a status of the vehicle transmission 16. This may be particularly applicable in case that the transmission 16 is an automated transmission (i.e. automatic, double clutch transmission or the like). As an example, The BISG 26 may be configured to vary the negative torque using the state of the clutch (e.g. slipping, fully open, or closed), the transmission input speed, gear ratio, or the like. The BISG 26 may reduce the negative torque when the clutch is closed or slipping, and increase the negative torque when the clutch is open. The BISG 26 may be further configured to adjust the negative torque based on a gradient of the road. For instance, the BISG 26 may reduce the negative torque output when the vehicle 10 is in the direction of a positive gradient (i.e. uphill) to let the gravity and the weight of the vehicle stop the engine 14 (e.g. when the transmission clutch is slipping or closed).

Control logic or functions performed by one or more controllers may be represented by flow charts or similar diagrams in any of the various figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an engine including a crank shaft;
   a battery;
   a belt-integrated starter generator (BISG) mechanically coupled to the crank shaft and configured to generate electric power from motion of the engine to charge the battery; and
   a controller configured to
      operate the BISG to apply a load, having an initial magnitude proportional to a temperature of the engine, to the crank shaft to slow the engine and capture electric power for storage in the battery,
      responsive to a speed of the BISG or engine achieving a predetermined non-zero threshold, remove the load from the crank shaft, and
      bring the engine to a stop.

2. The vehicle of claim 1, wherein the vehicle further includes a transmission having a clutch and wherein the initial magnitude further depends on a state of the clutch such that the initial magnitude is less when the clutch is slipping compared to when the clutch is open.

3. The vehicle of claim 1, wherein the vehicle further includes a transmission having a clutch and wherein the initial magnitude further depends on a state of the clutch such that the initial magnitude is less when the clutch is closed compared to when the clutch is open.

4. The vehicle of claim 1, wherein the initial magnitude is further inversely proportional to a pitch of the vehicle.

5. The vehicle of claim 1, wherein the initial magnitude is further proportional to the speed of the BISG or engine.

6. The vehicle of claim 1, wherein the initial magnitude further depends on a presence or absence of an auxiliary load mechanically coupled to the crank shaft such that the initial magnitude is less during the presence of the auxiliary load compared to during the absence of the auxiliary load.

7. The vehicle of claim 1, wherein the initial magnitude is further proportional to a temperature of the engine.

8. The vehicle of claim 1, wherein the initial magnitude further depends on a presence or absence of an auxiliary load mechanically coupled to the crank shaft such that the initial magnitude is less during the presence of the auxiliary load compared to during the absence of the auxiliary load.

9. A method for a vehicle, comprising:
   by a controller,
      operating a BISG to apply a load having an initial magnitude to a crank shaft of an engine to slow the engine and capture electric power for storage in a battery, wherein the initial magnitude depends on a state of a clutch of a transmission such that the initial magnitude is less when the clutch is slipping or being closed compared with the clutch being open,
      responsive to a speed of the BISG or engine achieving a predetermined non-zero threshold, removing the load from the crank shaft, and
      bringing the engine to a stop.

10. The method of claim 9, wherein the initial magnitude is also proportional to a temperature of the engine.

11. The method of claim 9, wherein the initial magnitude is also inversely proportional to a pitch of the vehicle.

12. The method of claim 9, wherein the initial magnitude is also proportional to the speed of the BISG or engine.

13. The method of claim 9, wherein the initial magnitude further depends on a presence or absence of an auxiliary load mechanically coupled to the crank shaft such that the initial magnitude is less during the presence of the auxiliary load compared to during the absence of the auxiliary load.

14. A vehicle comprising:
   an engine including a crank shaft;
   a battery;
   a belt-integrated starter generator (BISG) mechanically coupled to the crank shaft and configured to generate electric power from motion of the engine to charge the battery; and
   a controller configured to
      operate the BISG to apply a load to the crank shaft to slow the engine and capture electric power for storage in the battery, wherein an initial magnitude of the load is proportional to a speed of the BISG or engine, and
      responsive to the speed achieving a predetermined non-zero threshold, remove the load from the crank shaft.

15. The vehicle of claim 14, wherein the vehicle further includes a transmission having a clutch and wherein the initial magnitude further depends on a state of the clutch such that the initial magnitude is less when the clutch is slipping or being closed compared to when the clutch is open.

16. The vehicle of claim 14, wherein the initial magnitude is further inversely proportional to a pitch of the vehicle.

* * * * *